United States Patent
Chen et al.

(10) Patent No.: US 11,055,846 B2
(45) Date of Patent: Jul. 6, 2021

(54) METHOD FOR OBTAINING A FLUORESCENT FUNDUS IMAGE AND A DEVICE THEREOF

(71) Applicants: Acer Incorporated, New Taipei (TW); National Taiwan University, Taipei (TW)

(72) Inventors: Ming-Ke Chen, New Taipei (TW); Chin-Han Tsai, New Taipei (TW); Yi-Ting Hsieh, Taipei (TW)

(73) Assignees: Acer Incorporated, New Taipei (TW); National Taiwan University, Taipei (TW)

( * ) Notice: Subject to any disclaimer, the term of this patent is extended or adjusted under 35 U.S.C. 154(b) by 80 days.

(21) Appl. No.: 16/411,151

(22) Filed: May 14, 2019

(65) Prior Publication Data
US 2020/0226747 A1 Jul. 16, 2020

(30) Foreign Application Priority Data
Jan. 11, 2019 (TW) .................................. 108101156

(51) Int. Cl.
*G06T 7/00* (2017.01)
*G06T 7/90* (2017.01)

(52) U.S. Cl.
CPC .............. *G06T 7/0012* (2013.01); *G06T 7/90* (2017.01); *G06T 2207/10064* (2013.01); *G06T 2207/20048* (2013.01); *G06T 2207/30041* (2013.01)

(58) Field of Classification Search
CPC . G06T 2207/10024; G06T 2207/10064; G06T 7/0012; G06T 7/90
See application file for complete search history.

(56) References Cited

U.S. PATENT DOCUMENTS

| | | | |
|---|---|---|---|
| 2008/0084538 A1 | 4/2008 | Maeda et al. | |
| 2012/0229766 A1* | 9/2012 | Russmann | A61B 3/12 351/206 |
| 2014/0333896 A1* | 11/2014 | Ueno | A61B 3/10 351/211 |
| 2016/0073876 A1* | 3/2016 | Akita | A61B 3/0058 351/206 |
| 2016/0360963 A1* | 12/2016 | Kubota | A61B 3/0025 |

FOREIGN PATENT DOCUMENTS

| | | |
|---|---|---|
| CN | 104036521 | 9/2014 |
| CN | 104299242 | 1/2015 |
| TW | 201247182 | 12/2012 |

* cited by examiner

*Primary Examiner* — John J Lee
(74) *Attorney, Agent, or Firm* — JCIPRNET

(57) ABSTRACT

The disclosure provides a method for obtaining a fluorescent fundus image, the method including the following steps: receiving a to-be-detected color fundus image; obtaining a color feature of the to-be-detected color fundus image; encoding the color feature of the to-be-detected color fundus image according to a fundus image transformation model to transform the to-be-detected color fundus image into a to-be-detected fluorescent fundus image; and outputting the to-be-detected fluorescent fundus image.

8 Claims, 2 Drawing Sheets

METHOD FOR OBTAINING A FLUORESCENT FUNDUS IMAGE AND A DEVICE THEREOF

CROSS-REFERENCE TO RELATED APPLICATION

This application claims the priority benefit of Taiwan application serial no. 108101156, filed on Jan. 11, 2019. The entirety of the above-mentioned patent application is hereby incorporated by reference herein and made a part of this specification.

BACKGROUND

Technical Field

The disclosure relates to a human body detection technique, and more particularly to a method for obtaining a fluorescent fundus image and a device thereof.

Description of Related Art

Fluorescent fundus photography is used to examine vascular lesions behind the eye, for example, diabetic retinopathy, vascular occlusive changes, macular degeneration, and the like. Although fluorescent fundus photography is currently the most accurate method for diagnosing vascular lesions, since it requires the aid of a mydriatic and a fluorescent agent, a testee has to wait for the mydriatic and the fluorescent agent to take effect in their body before undergoing the fluorescent fundus photography. As a result, the test takes a long time every time. Moreover, due to chemical effects of the fluorescent agent, the testee is at risk of suffering from nausea, vomiting, allergies or even anaphylactic shock. Therefore, although fluorescent fundus photography has higher accuracy, it is not the first choice for eye examination. Based on this, how to provide accurate image analysis while preventing the testee from waiting too long and feeling uncomfortable is a problem that persons skilled in the art have been dedicated to dealing with.

SUMMARY

The disclosure provides a method for obtaining a fluorescent fundus image and a device thereof to transform a color fundus image into a fluorescent fundus image, such that the testee does not have to wait long and does not feel uncomfortable during fluorescent fundus photography.

A method for obtaining a fluorescent fundus image according to the disclosure includes the following steps. A to-be-detected color fundus image is received. A color feature of the to-be-detected color fundus image is obtained. The color feature of the to-be-detected color fundus image is encoded according to a fundus image transformation model to transform the to-be-detected color fundus image into a to-be-detected fluorescent fundus image. The to-be-detected fluorescent fundus image is output.

A device for obtaining a fluorescent fundus image according to the disclosure has an input unit, a storage unit and a processing unit. The input unit receives a to-be-detected color fundus image. The storage unit stores a fundus image transformation model. The processing unit is connected to the input unit and the storage unit. The processing unit further obtains a color feature of the to-be-detected color fundus image, encodes the color feature of the to-be-detected color fundus image according to the fundus image transformation model to transform the to-be-detected color fundus image into a to-be-detected fluorescent fundus image, and outputs the to-be-detected fluorescent fundus image.

Based on the above, the method for obtaining a fluorescent fundus image and the device for obtaining a fluorescent fundus image according to the disclosure are capable of transforming the to-be-detected color fundus image by encoding, so as to change a color fundus image to a fluorescent fundus image. Therefore, simply by taking a to-be-detected color fundus image, the testee can obtain a corresponding fluorescent fundus image, without having to undergo the lengthy fluorescent fundus photography procedure or having to endure the discomfort caused by the fluorescent agent.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following embodiments, "color fundus image" and "to-be-detected color fundus image" refer to, in the case where no fluorescent agent is injected into a human body, color images taken of a corresponding human fundus. "Fluorescent fundus image" refers to, in the case where a fluorescent agent is injected into a human body, an image taken of a corresponding human fundus.

Figure 1:
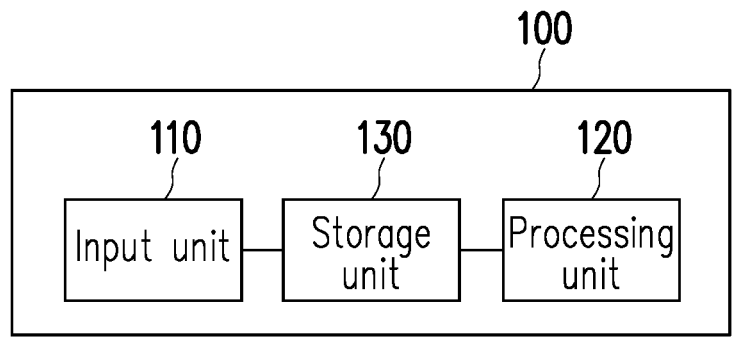
FIG. 1 illustrates a schematic view of a device for obtaining a fluorescent fundus image according to an embodiment of the disclosure.

FIG. 1 illustrates a schematic view of a device for obtaining a fluorescent fundus image according to an embodiment of the disclosure. Referring to FIG. 1, a device 100 for obtaining a fluorescent fundus image at least has an input unit 110, a storage unit 120, and a processing unit 130.

The input unit 110 receives a to-be-detected color fundus image. In an embodiment of the disclosure, the input unit 110 can be implemented with a fundus camera. That is, the to-be-detected color fundus image is received by taking a photo of a testee's fundus. In another embodiment of the disclosure, the input unit 110 can be implemented by using a connection port receiving digital data transmission. For example, an RS-232 interface supporting various types of communication protocols, a Universal Serial Bus (USB), a Wireless Fidelity (Wi-Fi) interface, an RJ45 interface or the like may be used, but the disclosure is not limited thereto. That is, the device 100 for obtaining a fluorescent fundus image may receive the to-be-detected color fundus image directly by taking a photo or indirectly through transmission, and the disclosure is not limited thereto.

The storage unit 120 is configured to store various data and codes required for operation of the device 100 for obtaining a fluorescent fundus image. In particular, the storage unit 120 stores a fundus image transformation model having parameters for transforming color fundus images into corresponding fluorescent fundus images. In an embodiment of the disclosure, hardware of the storage unit 120 may be various types of nonvolatile memories, for example, storage devices such as hard disk drives (HDDs) and solid-state drives (SSDs). However, the disclosure is not limited thereto.

The processing unit 130 is connected to the input unit 110 and the storage unit 120, and is configured to perform various operations required for operation of the device 100 for obtaining a fluorescent fundus image. Details of the operations will be described later. In an embodiment of the disclosure, the processor unit 130 is, for example, a central processing unit (CPU), a microprocessor, a digital signal processor (DSP), a programmable controller, a programmable logic device (PLD) or other similar device or a combination thereof. The disclosure is not limited thereto.

Figure 2:
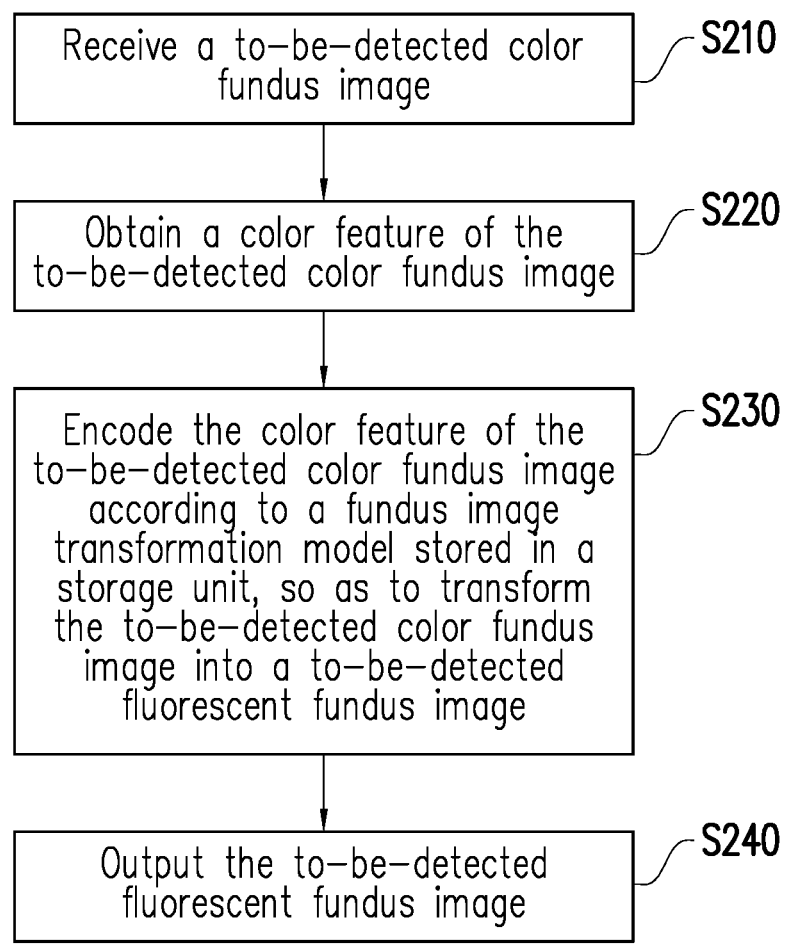
FIG. 2 illustrates a schematic flowchart of a method for obtaining a fluorescent fundus image according to an embodiment of the disclosure.

FIG. 2 illustrates a schematic flowchart of a method for obtaining a fluorescent fundus image according to an embodiment of the disclosure. Referring to FIG. 2, the method for obtaining a fluorescent fundus image in the present embodiment is at least applicable to the device 100 for obtaining a fluorescent fundus image as illustrated in FIG. 1, but is not limited thereto. Details of the method for obtaining a fluorescent fundus image will be described below with reference to FIG. 1 and FIG. 2.

In step S210, a to-be-detected color fundus image is received by the input unit 110. Specifically, as described above, the input unit 110 may receive the to-be-detected color fundus image for diagnosis by taking a photo of a human fundus or through transmission.

In step S220, a color feature of the to-be-detected color fundus image is obtained by the processing unit 130. It is worth mentioning that, in an embodiment of the disclosure, in order to obtain the color feature promptly and accurately, the processing unit 130 further performs a preprocessing procedure on the to-be-detected color fundus image. The preprocessing procedure includes, for example, at least one of gray scale processing, eye positioning, and image enhancement.

In the gray scale processing, an image is converted into grayscale so as to emphasize image features. In the eye positioning, the position of a user's eye is first identified to thereby filter out area other than the fundus. In the image enhancement, for example, smoothing is performed on an image using a Gaussian filter.

In step S230, the color feature of the to-be-detected color fundus image is encoded by the processing unit 130 according to the fundus image transformation model stored in the storage unit 120, so that the to-be-detected color fundus image is transformed into a to-be-detected fluorescent fundus image. Since the fundus image transformation model has the parameters and rules for transforming color fundus images into fluorescent fundus images, the processing unit 130 is capable of encoding the color feature of the to-be-detected color fundus image according to the fundus image transformation model, thereby outputting the corresponding to-be-detected fluorescent fundus image.

In step S240, the to-be-detected fluorescent fundus image is output by the processing unit 130. In this way, it is possible for medical staff to determine whether the testee's fundus corresponds to fundus conditions of a potential disease through the output fluorescent fundus image, and then provide treatment to the testee.

It is worth mentioning that, in some embodiments of the disclosure, the storage unit 120 is further capable of storing disease-related fluorescent image features. Based on this, when obtaining a fluorescent feature of the fluorescent fundus image, the processing unit 130 is further capable of automatically determining disease information corresponding to the fluorescent fundus image according to the fluorescent feature.

Figure 3:
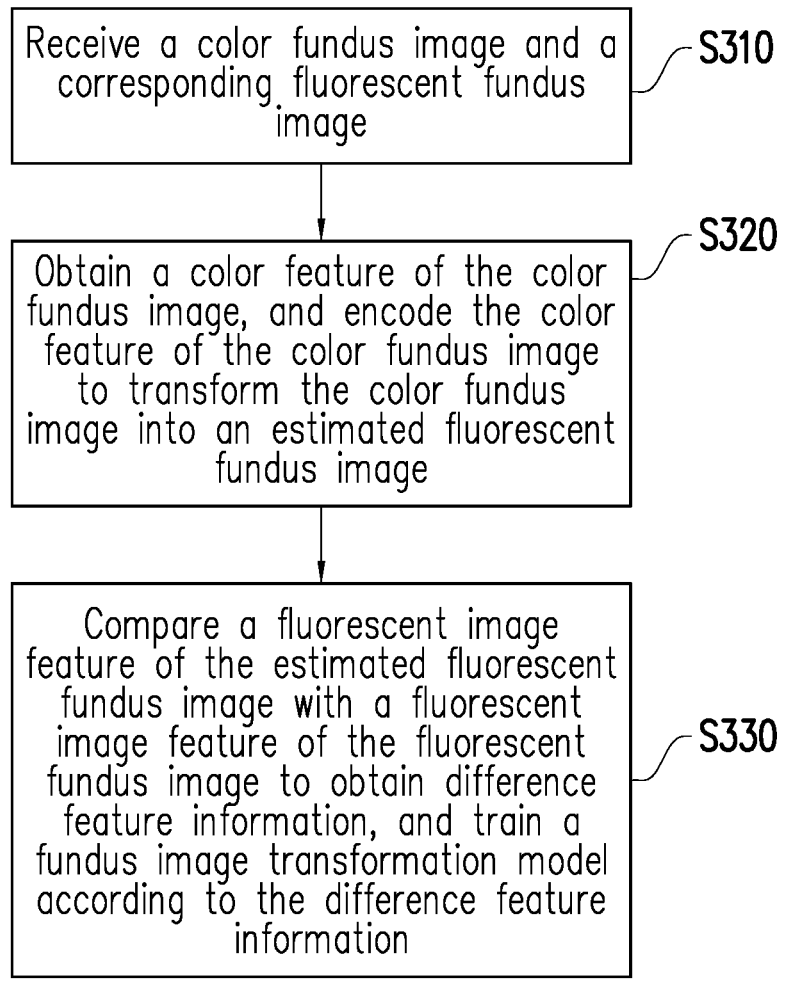
FIG. 3 illustrates a schematic flowchart of a method for obtaining a fundus image transformation model according to an embodiment of the disclosure.

FIG. 3 illustrates a schematic flowchart of a method for obtaining a fundus image transformation model according to an embodiment of the disclosure. The method for obtaining a fundus image transformation model will be described below with reference to FIG. 1 and FIG. 3.

In step S310, a color fundus image and a corresponding fluorescent fundus image are received by the input unit 110. Specifically, the color fundus image and the fluorescent fundus image received by the input unit 110 correspond to measurement results of the same testee. That is, the color fundus image and the fluorescent fundus image are historical information that was actually detected.

In step S320, by the processing unit 130, a color feature of the color fundus image is obtained, and the color feature of the color fundus image is encoded to transform the color fundus image into an estimated fluorescent fundus image. In an embodiment of the disclosure, the processing unit 130 encodes the color feature of the color fundus image according to an autoencoder, but the disclosure is not limited thereto.

In addition, to reduce the time spent on encoding, the processing unit 130 also performs a preprocessing procedure on the color fundus image. The content of the preprocessing procedure has been explained above and will not be repeated herein.

In step S330, by the processing unit 130, a fluorescent image feature of the estimated fluorescent fundus image is compared with a fluorescent image feature of the fluorescent fundus image to obtain difference feature information, and the fundus image transformation model is trained according to the difference feature information.

That is, the color fundus image and the fluorescent fundus image correspond to the same testee; if not considering various external factors such as image recognizability, camera accuracy and so on, fundus images obtained by subjecting the same testee to any tests will theoretically be the same. Based on this, by the fundus image transformation model, the estimated fluorescent fundus image generated by encoding the color fundus image should have the same fluorescent image feature as the fluorescent fundus image. Therefore, the processing unit 130 is capable of determining a difference between the fluorescent fundus images to obtain the difference feature information, and training and adjusting the fundus image transformation model by adjusting an error caused by the encoding according to the difference feature information.

It is worth mentioning that, in the early stage of the training of the fundus image transformation model, since the fundus image transformation model does not yet have clear parameters and rules for transformation between color fundus images and fluorescent fundus images, there is a clearer distinction between the estimated fluorescent fundus image after transformation and the fluorescent fundus image. At this moment, the processing unit 130 performs the encoding on a smaller scale, for example, based on a color feature or an area. In the later stages of the training, since the parameters and rules for transformation between color fundus images and fluorescent fundus images become clearer, the processing unit 130 can perform the encoding on a larger scale, for example, with respect to the whole color fundus image, thereby enhancing learning efficiency. However, the disclosure is not limited thereto.

In summary, the method for obtaining a fluorescent fundus image and the device for obtaining a fluorescent fundus image according to the disclosure are capable of transforming the to-be-detected color fundus image by encoding, so as to change the color fundus image to the fluorescent fundus image. Therefore, simply by taking a to-be-detected color fundus image, the testee can obtain a corresponding fluorescent fundus image, without having to undergo the lengthy fluorescent fundus photography procedure or having to endure the discomfort caused by the fluorescent agent.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for obtaining a fluorescent fundus image, the method comprising:
   receiving a to-be-detected color fundus image;
   obtaining a color feature of the to-be-detected color fundus image;
   receiving a color fundus image and a corresponding fluorescent fundus image;
   obtaining a color feature of the color fundus image;
   encoding the color feature of the color fundus image to transform the color fundus image into an estimated fluorescent fundus image;
   comparing a fluorescent image feature of the estimated fluorescent fundus image with a fluorescent image feature of the fluorescent fundus image to obtain difference feature information;
   training a fundus image transformation model according to the difference feature information;
   encoding the color feature of the to-be-detected color fundus image according to the fundus image transformation model to transform the to-be-detected color fundus image into a to-be-detected fluorescent fundus image; and
   outputting the to-be-detected fluorescent fundus image.

2. The method for obtaining a fluorescent fundus image according to claim 1, wherein the step of encoding the color feature comprises:
   encoding the color feature of the color fundus image according to an autoencoder.

3. The method for obtaining a fluorescent fundus image according to claim 1, the method further comprising:
   performing a preprocessing procedure on at least one of the to-be-detected color fundus image and the color fundus image, wherein the preprocessing procedure comprises at least one of gray scale processing, eye positioning, and image enhancement.

4. The method for obtaining a fluorescent fundus image according to claim 1, the method further comprising:
   obtaining a fluorescent feature of the fluorescent fundus image, and determining disease information corresponding to the fluorescent fundus image according to the fluorescent feature.

5. A device for obtaining a fluorescent fundus image, the device comprising:
   an input unit receiving a to-be-detected color fundus image;
   a storage unit storing a fundus image transformation model; and
   a processing unit connected to the input unit and the storage unit, wherein
   the input unit further receives a color fundus image and a corresponding fluorescent fundus image,
   the processing unit further obtains a color feature of the color fundus image, and encodes the color feature of the color fundus image to transform the color fundus image into an estimated fluorescent fundus image,
   the processing unit further compares a fluorescent image feature of the estimated fluorescent fundus image with a fluorescent image feature of the fluorescent fundus image to obtain difference feature information, and trains the fundus image transformation model according to the difference feature information,
   the processing unit further obtains a color feature of the to-be-detected color fundus image, encodes the color feature of the to-be-detected color fundus image according to the fundus image transformation model to transform the to-be-detected color fundus image into a to-be-detected fluorescent fundus image, and outputs the to-be-detected fluorescent fundus image.

6. The device for obtaining a fluorescent fundus image according to claim 5, wherein
   the processing unit encodes the color feature of the color fundus image according to an autoencoder.

7. The device for obtaining a fluorescent fundus image according to claim 5, wherein
   the processing unit further performs a preprocessing procedure on at least one of the to-be-detected color fundus image and the color fundus image, wherein the preprocessing procedure comprises at least one of gray scale processing, eye positioning, and image enhancement.

8. The device for obtaining a fluorescent fundus image according to claim 5, wherein
   the processing unit further obtains a fluorescent feature of the fluorescent fundus image, and determines disease information corresponding to the fluorescent fundus image according to the fluorescent feature.

* * * * *